United States Patent [19]

Hunter

[11] Patent Number: 4,644,907

[45] Date of Patent: Feb. 24, 1987

[54] BOILER TUBES OF ENHANCED EFFICIENCY AND METHOD OF PRODUCING SAME

[76] Inventor: Edward H. Hunter, P.O. Box 507, Westbury, N.Y. 11590

[21] Appl. No.: 802,834

[22] Filed: Nov. 29, 1985

[51] Int. Cl.⁴ .................. F22B 15/00; F22B 25/00; F22B 37/10

[52] U.S. Cl. .................. 122/235 C; 106/14.05; 122/DIG. 13; 138/145; 165/133; 427/255.6; 427/255.7

[58] Field of Search ................. 138/145, 146, DIG. 6; 165/133; 122/DIG 13, 235 C; 106/14.05, 14.14; 427/255.6, 255.7

[56] References Cited

U.S. PATENT DOCUMENTS

| | | | |
|---|---|---|---|
| 3,825,064 | 7/1974 | Inoue | 165/133 X |
| 4,116,016 | 9/1978 | Roop | 122/DIG. 13 |
| 4,427,034 | 1/1984 | Nagata et al. | 138/145 |

FOREIGN PATENT DOCUMENTS 23801  2/1979  Japan .................. 122/DIG. 13

Primary Examiner—Edward G. Favors
Attorney, Agent, or Firm—Charles E. Baxley

[57] ABSTRACT

A composite boiler tube has a fireside surface and a water-side surface and comprises a metallic tubular member having an outer surface and an inner surface. One of the metallic surfaces has an efficiency enhancing coating adhered thereto and providing the composite tube with the fireside surface or the waterside surface. A method of enhancing the efficiency of a boiler tube which comprises a metallic tubular member having an outer surface and an inner surface includes the step of applying a coating of efficiency enhancing material adhered to one of the metallic tube member surfaces, thus to produce a composite boiler tube.

8 Claims, 2 Drawing Figures

BOILER TUBES OF ENHANCED EFFICIENCY AND METHOD OF PRODUCING SAME

BACKGROUND OF THE INVENTION

This invention relates to composite boiler tubes of enhanced efficiency and to a method of enhancing the efficiency of boiler tubes.

It is known that, in operation, the efficiency of a water-tube boiler or a fire-tube boiler drops in a relatively short time, due to the build-up of soot on the firesides of the tubes and fouling particle debris on the watersides of the tubes, both of which adversely affect heat transfer through the tube walls. Furthermore, the soot and the fouling particle debris also contributes to undersirable build-up of frictional resistance to fluid circulation, on both the watersides of the tubes and the firesides thereof.

Additionally, conventional boiler tubes are subject to corrosion and pitting.

It is an important object of the invention to provide a boiler tube of enhanced efficiency, the enhanced efficiency being occasioned by slowing down the build-up of soot on the firesides of the tubes, slowing down fouling particle debris build-up on the watersides of the tubes and resisting build-up of frictional resistance to fluid circulation.

Another object is to increase tube longevity by guarding against corrosion and pitting of tubes.

Further objects are to reduce boiler down-time and hence decrease maintenance costs.

Yet an additional object is to reduce fuel consumption.

The above and additional objects and advantages, and the manner of attainment thereof, will appear hereinafter.

SUMMARY OF THE INVENTION

In its article aspect, the invention provides a composite boiler tube having a fireside surface and a waterside surface. The composite tube comprises a metallic tubular member having an outer surface and an inner surface. One of the metallic surfaces has an efficiency enhancing coating adhered thereto, the coating providing the composite tube with one of the fireside surface and the waterside surface. Preferably, the other of the metallic surfaces also has an efficiency enhancing coating adhered thereto, this latter coating providing the composite tube with the other of the fireside surface and the waterside surface.

The inventive method of enhancing the efficiency of a boiler tube which comprises a metallic tubular member having an outer surface and an inner surface and includes the step of applying a coating of efficiency enhancing material adhered to one of the metallic tube surfaces, thus to produce a composite boiler tube. Preferably, the method also includes the step of applying a coating of efficiency enhancing material adhered to the other of the metallic surfaces.

Suitable coating materials are dichlorodimethylsilane or its more expensive fluorocarbon composition version, and the radial thickness can be a slittle as about $1 \times 10^{-6}$ inch ($2.54 \times 10^{-6}$ cm), which is small enough not to interfere with heat transfer or adversely affect the fluid carrying capacity of the tube. Furthermore, these materials are transparent, thus permitting visual examination of the outer surface of the metallic tubular member through any coating thereon.

DESCRIPTION OF THE INVENTION

Figure 1:
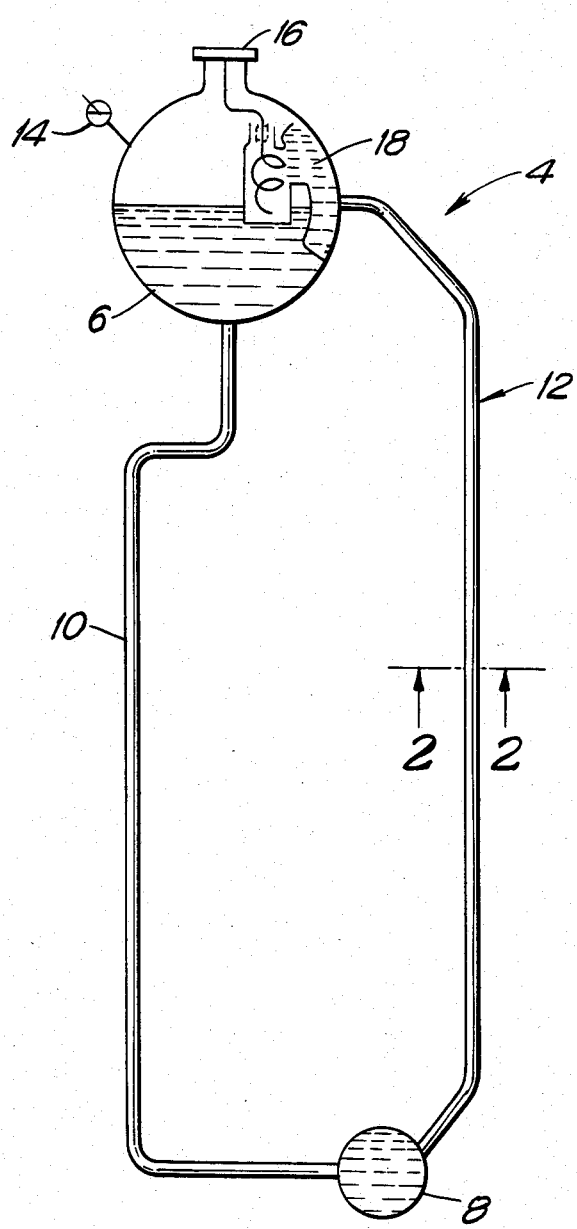
FIG. 1 is a schematic view of a typical water-tube boiler having tubes embodying the invention.

The invention will be described as embodied in a water-tube boiler 4, although by no means is it to be taken as limited thereto.

As is well known, boiler 4 has an upper or steam drum or header 6 in which steam is separated from water and a lower drum or header 8 at the low point of the system.

Boiler 4 further has one or more substantially vertical downcomer tubes 10 which provide for the flow of relatively cool water downwardly from steam drum 6 to lower drum 8. Only one downcomer tube 10 is shown, although there may be from two to several dozen downcomer tubes 10.

Boiler 4 additionally has a plurality of substantially vertical boiler riser tubes 12. Only one riser tube 12 is shown, although there may be several hundred riser tubes 12 in a large installation.

Riser tubes 12 connect lower drum 8 and steam drum 6 and are located in tube banks across which the hot products of combustion flow. Thus, riser tubes 12 are heated and steam is generated therein and is separated from the water in steam drum 6.

Circulation occurs because of the difference in the density of the relatively steam-free water in downcomer tubes 10 and the steam-water mixture in riser tubes 12.

Riser tubes 12 normally have an outside diameter of 2 inches (5.08 cm), 3 inches (7.62 cm) or 3.25 inches (8.26 cm).

Feedwater is supplied to steam drum 6 at inlet 14 and steam leaves drum 6 at outlet 16, after being separated from the water in drum 6 at area 18. The system of downcomer tubes 10 and riser tubes 12 is subject to a certain amount of fluid friction therein, which friction resists fluid circulation. It would be advantageous to reduce this friction.

Figure 2:
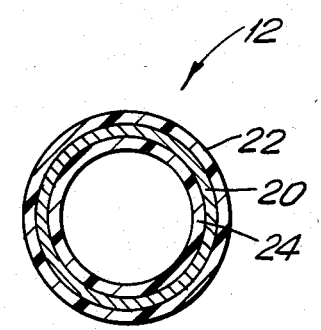
FIG. 2 is an enlarged view taken on line 2—2 of FIG. 1.

From FIG. 2 it will be observed that each riser tube 12 comprises a tubular metal member 20 the outer surface of which has adhered thereto an external coating 22 of uniform radial thickness. It has been found that if the material of coating 22 is properly chose, riser tube 12 will exhibit a substantial soot repelling capability which will substantially increase the efficiency of boiler 4.

As illustrated in FIG. 2, the inner surface of tubular metal member 20 has adhered thereto an internal coating 24 of uniform radial thickness. If the material of coating 24 is properly chosen, tube 12 will minimize the deposit of fouling particle debris in riser tube 12 and will also reduce frictional resistance to fluid flow therein, further enhancing the efficiency of boiler 4.

Suitable examples of materials for coating 22 and 24 are dichlorodimethylsilane, or its more expensive fluorocarbon composition version, or materials of similar properties.

Coatings 22 and 24 may be of very low thickness, on the order of as little as $1 \times 10^{-6}$ inch ($2.54 \times 10^{-6}$ cm), so as not to interfere with heat transfer therethrough. Thus, there is no heat transfer penalty.

Coatings 22 and 24 are transparent, so that the outer surface of tubular metal member 20 can be examined for pitting and corrosion damage.

Coatings 22 and 24 are non-toxic to human beings and the environment.

Coatings 22 and 24 have useful longevity of up to perhaps five years or more.

Coating 22 and 24 will withstand elevated boiler combustion chamber temperature of 1100° F. and could withstand as high as 1250° F.

Coatings 22 and 24 are compatible with cleaned or oxidized surfaces and thus can be adhered to either new or used tubular members 20.

Furthermore, with the materials mentioned, the organic fraction of the coating material cannot aggravate ash deposition.

In water-tube boiler 4, the outer surface of each riser tube 12 is the "fireside" and the inner surface of each riser tube 12 is the "waterside." In a fire-tube boiler, the situation is reversed, i.e., the outer surface is the "waterside" and the inner surface is the "fireside." The invention is applicable to both types of boilers.

In either case, the coatings can be applied by a known vaporization process.

As indicated above, certain benefits, in terms of increased boiler efficiency, are obtained by coating only the inside surface or the outside surface of tubular member 20. Hence, the invention contemplates the coating of either or both of the inside surface or the outside surface of tubular member 20.

The invention is well suited to the attainment of the objects and advantages set forth above and others.

The disclosed details are exemplary only and are not to be taken as limitations on the invention except as those details may be included in the appended claims.

What is claimed is:

1. A composite boiler tube having a fireside surface and a waterside surface and comprising a metallic tubular member having an outer surface and an inner surface, at least one of said metallic surfaces having an efficiency enhancing coating adhered thereto and providing said composite tube with one of said fireside surface and said waterside surface, wherein the material of said coating is dichlorodimethylsilane or its fluorocarbon composition version and wherein the radial thickness of said coating is on the order of $1 \times 10^{-6}$ inch ($2.54 \times 10^{-6}$ cm).

2. A composite tube according to claim 1 wherein said one said metallic surface is said outer surface.

3. A composite tube according to claim 1 wherein said one said metallic surface is said inner surface.

4. A composite tube according to claim 1 wherein each said metallic surface has a said efficiency enhancing coating adhered thereto, said coatings providing both said fireside surface and said waterside surface.

5. A composite tube according to claim 1 wherein said one metallic surface is said outer surface and said coating provides said fireside surface.

6. A composite tube according to claim 5 wherein said coating is transparent.

7. A method of enhancing the efficiency of a boiler tube comprising a metallic tubular member having an outer surface and an inner surface, said method including the step of applying by vaporization a coating of efficiency enhancing material adhered to one of said surfaces, thus to produce a composite boiler tube, wherein the material of said coating is dichlorodimethylsilane or its fluorocarbon composition version and said coating is applied to a radial thickness on the order of $1 \times 10^{-6}$ inch ($2.54 \times 10^{-6}$ cm).

8. A method according to claim 7 including the further step of applying a said coating of efficiency enhancing material adhered to the other of said surfaces.

* * * * *